US010230996B1

(12) United States Patent
Abreu et al.

(10) Patent No.: US 10,230,996 B1
(45) Date of Patent: Mar. 12, 2019

(54) PROVIDING DISPARATE AUDIO BROADCASTS FOR A CONTENT ITEM OF A CONTENT SHARING PLATFORM

(71) Applicant: Google Inc., Mountain View, CA (US)

(72) Inventors: Ivo Daniel Carreira Abreu, Adliswil (CH); Manuel Franceschini, Adliswil (CH)

(73) Assignee: Google LLC, Mountain View, CA (US)

( * ) Notice: Subject to any disclaimer, the term of this patent is extended or adjusted under 35 U.S.C. 154(b) by 510 days.

(21) Appl. No.: 14/165,407

(22) Filed: Jan. 27, 2014

Related U.S. Application Data

(63) Continuation of application No. 13/826,596, filed on Mar. 14, 2013, now abandoned.

(51) Int. Cl.
  *H04N 21/233* (2011.01)
  *H04N 21/242* (2011.01)

(52) U.S. Cl.
  CPC ......... *H04N 21/233* (2013.01); *H04N 21/242* (2013.01)

(58) Field of Classification Search
  CPC .. H04N 21/00; H04N 21/233; H04N 21/2335; H04N 21/234; H04N 21/23406; H04N 21/2343; H04N 21/234309; H04N 21/234318; H04N 21/234327; H04N 21/234336; H04N 21/234345; H04N 21/234354; H04N 21/234363; H04N 21/234372; H04N 21/234381
  USPC .................................................... 725/93, 28
  See application file for complete search history.

(56) References Cited

U.S. PATENT DOCUMENTS

| | | | | |
|---|---|---|---|---|
| 6,542,692 | B1* | 4/2003 | Houskeeper | G11B 27/034 386/278 |
| 8,577,053 | B1* | 11/2013 | Simon | 381/82 |
| 8,995,688 | B1* | 3/2015 | Chemtob | H04R 1/1091 381/109 |
| 9,037,971 | B2* | 5/2015 | Gavade | H04N 21/2743 715/716 |
| 2003/0088612 | A1* | 5/2003 | Goldschmidt Iki | H04N 5/44543 709/202 |
| 2006/0170760 | A1* | 8/2006 | Anderson et al. | 348/14.04 |
| 2007/0117635 | A1* | 5/2007 | Spanton et al. | 463/43 |
| 2007/0206505 | A1* | 9/2007 | Forbes | H04M 7/0072 370/252 |
| 2008/0028023 | A1* | 1/2008 | Locke | 709/203 |
| 2008/0159724 | A1* | 7/2008 | Purvis et al. | 386/126 |
| 2009/0079833 | A1* | 3/2009 | Abraham | G10H 1/0008 348/169 |
| 2010/0062754 | A1* | 3/2010 | Allen | G10L 21/00 455/418 |

(Continued)

*Primary Examiner* — Nasser M Goodarzi
*Assistant Examiner* — Adil Ocak
(74) *Attorney, Agent, or Firm* — Lowenstein Sandler LLP (57) ABSTRACT

A method for providing disparate audio broadcasts for a content item of a content sharing platform is disclosed. The method includes receiving, by a processing device, a selection of an audio commentary from a viewer of a content item having a video portion, the audio commentary associated with the content item and recorded separately from an original recording of the content item. The method also includes synchronizing the selected audio commentary with the video portion of the content item. The method further includes providing the audio commentary in conjunction with the video portion to the viewer.

18 Claims, 6 Drawing Sheets

(56) References Cited

U.S. PATENT DOCUMENTS

2010/0306796 A1* 12/2010 McDonald et al. ............ 725/32
2011/0126255 A1*  5/2011 Perlman et al. .............. 725/116
2012/0110611 A1*  5/2012 Seidel et al. .................... 725/28
2013/0182119 A1*  7/2013 Eledath et al. ............... 348/159

* cited by examiner

```
┌─────────────────────────────────────────────────────────────────┐
│   Receive audio recording from a first user of a shared         │
│   content hosting and delivery platform                         │
│                                                             210 │
└─────────────────────────────────────────────────────────────────┘
                                │
                                ▼
┌─────────────────────────────────────────────────────────────────┐
│  Identify content item of shared content hosting and delivery   │
│  platform associated with the received audio recording, where   │
│  the audio recording is not originally part of the content item │
│                                                             220 │
└─────────────────────────────────────────────────────────────────┘
                                │
                                ▼
┌─────────────────────────────────────────────────────────────────┐
│  Store received audio recording and an identifier of the        │
│  content item to which the audio recording is associated        │
│                                                             230 │
└─────────────────────────────────────────────────────────────────┘
                                │
                                ▼
┌─────────────────────────────────────────────────────────────────┐
│  Provide audio recording as an audio feed that can be           │
│  synchronized with a video portion of the content item when     │
│  the content item is selected for viewing by a second user of   │
│  the shared content hosting and delivery platform               │
│                                                             240 │
└─────────────────────────────────────────────────────────────────┘
```

FIG. 5

PROVIDING DISPARATE AUDIO BROADCASTS FOR A CONTENT ITEM OF A CONTENT SHARING PLATFORM

CROSS-REFERENCE TO RELATED APPLICATIONS

This patent application is a continuation of U.S. Non-Provisional application Ser. No. 13/826,596, filed Mar. 14, 2013, entitled "PROVIDING DISPARATE AUDIO BROADCASTS FOR A CONTENT ITEM OF A CONTENT SHARING PLATFORM," which is incorporated herein by reference for all purposes.

TECHNICAL FIELD

This disclosure relates to the field of multimedia content and, in particular, to providing disparate audio broadcasts for a content item of a content sharing platform.

BACKGROUND

On the Internet, content sharing platforms allow users to upload, view, and share content, such as video content, image content, audio content, and so on. This shared content may include content from professional content creators, e.g., movie clips, TV clips, and music videos, as well as content from amateur content creators, e.g., video blogging and short original videos. In some cases, the shared content is provided as streaming media. Streaming media is multimedia, such as video and audio content, which is received by and presented to an end-user while being delivered by a streaming provider. Furthermore, some content sharing platforms provide live streaming of media, as well as streaming of pre-recorded media content.

Currently, watching events on television (TV) does not allow a viewer to choose the announcer for the event unless the viewer changes the channel. For example, with a sports event, there may be different viewers with different interests that are better served by selecting an announcer that matches the viewer's particular interest or bias. A viewer may want to choose an announcer for various reasons, but currently viewers of an event are tied to the official announcer of any given channel they are viewing. Related to this problem is the inability for a TV channel to provide announcers that suit all of the different interests of a diverse viewing audience. Currently, there is no way for a TV channel to let a user choose a different announcer.

Lastly, there is no straightforward way for talented individuals to offer their announcing skills to the world. It is currently very hard or impossible to broadcast a personal audio commentary for a given event.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing disparate audio broadcasts for a content item of a content sharing platform is disclosed. The method includes receiving, by a processing device, a selection of an audio commentary from a viewer of a content item having a video portion, the audio commentary associated with the content item and recorded separately from an original recording of the content item. The method also includes synchronizing the selected audio commentary with the video portion of the content item. The method further includes providing the audio commentary in conjunction with the video portion to the viewer.

The method may further include presenting the audio commentary as one of a plurality of audio commentaries that can be selected to play in conjunction with the video portion of the content item. In some implementations, the method may further include receiving, from the viewer, a selection of another audio commentary of the plurality of audio commentaries, decoupling the selected audio commentary from the video portion of the content item, synchronizing the another audio commentary with the video portion of the content item, and providing the synchronized another audio commentary and the video portion to the viewer.

In one implementation, a user interface (UI) is provided to display a listing of the plurality of audio commentaries. In addition, providing the audio commentary may also include adjusting the video portion with an artificial delay that is based on a location of a user that recorded the audio commentary and a location of the viewer.

In one implementation, the providing of the audio commentary further includes creating secondary audio based on environmental noise of the content item and then providing the secondary audio with the content item. In some implementations, a recording device of a computing device of a user of the content sharing platform records the audio commentary. In addition, the audio commentary may be categorized into a category comprising at least one of a language, a voice, a bias, a knowledge, or a locale.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for providing disparate audio broadcasts for a content item of a content sharing platform. In one implementation, users of a content sharing platform may record audio, such as a commentary, related to a content item provided by the content sharing platform. This recorded audio may then be made available by the content sharing platform to other users of the content sharing platform to stream along with a video portion of the content item associated with the audio recording. This may be accomplished using a recording device at a device of the user providing the audio recording.

In a similar vein, implementations of the disclosure afford users of the content sharing platform an ability to select from a variety of different audio streams (recorded by other users of the content sharing platform) to stream in conjunction with a video portion of a content item. As a result, users of the content sharing platform may select an audio stream that is consistent with a particular preference of the viewing user, such as a language preferences, a bias preferences, a locality preferences, and so on. In some implementations, the content item is a live event and the content sharing platform synchronizes the recorded audio and the video portion using an artificial delay that is based on a location of the recording user and a location of the viewing user.

In one implementation, a method for providing disparate audio broadcasts for a content item of a content sharing platform is disclosed. The method includes receiving, by a processing device, a selection of an audio commentary from a viewer of a content item having a video portion, the audio commentary associated with the content item and recorded separately from an original recording of the content item. The method also includes synchronizing the selected audio commentary with the video portion of the content item. The method further includes providing the audio commentary in conjunction with the video portion to the viewer.

Although implementations of the disclosure are described in terms of a content sharing platform, applications of implementations of the disclosure beyond a content sharing platform are also possible. For example, any content provider or television (TV) broadcasting system may implement the teachings described herein. As such, implementations of the disclosure are not limited to solely a content sharing platform.

Figure 1:
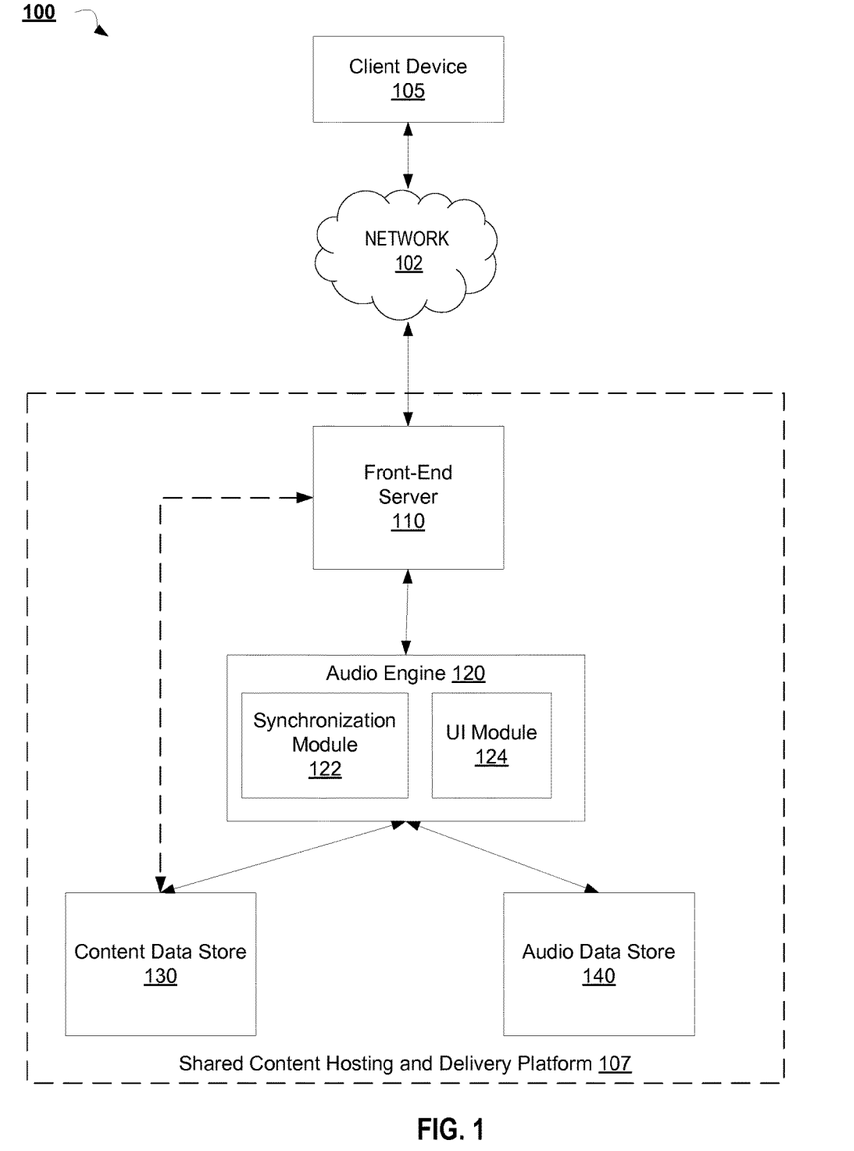
FIG. 1 is a block diagram illustrating an exemplary network architecture in which implementations of the disclosure may be implemented.

FIG. 1 is a block diagram illustrating an exemplary network architecture 100 in which implementations of the disclosure may be implemented. The network architecture 100 includes a client device 105 communicably coupled to a shared content hosting and delivery platform 107 via a network 102. In some implementations, content hosting and delivery platform 107 is also known as a content sharing platform. The network 102 includes the Internet in one implementation. In other implementations, other networks, wired and wireless, such as an intranet, local area network (LAN), wide area network (WAN), or broadcast network may be used as or be part of network 102.

As illustrated, shared content hosting and delivery platform 107 includes front-end server 110, an audio engine 120, a content data store 130, and an audio data store. A data store may include, but is not limited to, a table, a database, a directory, a repository, and one or more files, to name a few examples. One or more client devices 105 may be in communication with the front-end server 110 over the network 102.

The client device 105 may be any type of computing device, for example, a device including a processor, a computer-readable medium, and a memory. The client device 105 may be, for example, a personal computer, a laptop computer, a tablet computer, a personal digital assistant (PDA), a cellular telephone, other mobile devices, etc. In some implementations, the client device 105 may be executing a browser application or other application adapted to communicate over Internet related protocols (e.g., TCP/IP and HTTP) and/or display a user interface. While only a single client device 105 is shown in FIG. 1, network architecture 100 may support a large number of concurrent sessions with many client devices 105.

Shared content hosting and delivery platform 107 is capable of operating within a single server device or on multiple server devices. For example, although each of front-end server 110, audio engine 120, content data store 130, and audio data store 140 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

During operation of network architecture 100, a user may access shared content hosting and delivery platform 107 via client device 105 over network 102. The front-end server 110 receives communications from the client device 105, and processes and/or directs these communications accordingly. In one implementation, the front-end server 110 comprises a processing device and a computer-readable memory.

Front-end server 110 is communicably coupled to an audio engine 120, which may reside on the same machine as front-end server 110 or a different machine. Audio engine 120 may be implemented in hardware, software, firmware, or any combination of the above. In implementations of the disclosure, audio engine 120 accesses user content ("content item") that is uploaded to system 100 for storage in content data store 130 and provides to users of the shared content hosting and delivery platform 107 different audio commentary feeds for the accessed user content. Uploaded user content may include data sent from the client device 105 to the shared content hosting and delivery platform 107 with the intent that the shared content hosting and delivery platform 107 should store a copy of the data being transferred (e.g., in content data store 130). In implementations of the disclosure, user content includes content generated by a user or content generated by a third party and permissibly uploaded by the user. In some implementations, the content includes movie clips, TV clips (news, sports, shows, etc.), music videos, video blogs, and video shorts.

Audio commentary may include commentary about an ongoing event (e.g., comments about ongoing actions in the event, general information about the participants in the event, comments related to location of event, etc.), audio effects such as open air, studio, and so on, and audio advertisements, to name a few examples. An audio commentary feed that is selected from a list of audio commentary options for the content item is then associated with a video portion of the content item upon viewing of the content item by the user.

In one implementation, users of shared content hosting and delivery platform 107 may record commentary related to content uploaded to and provided by the shared content hosting and delivery platform 107. The users may record commentary related to content that is uploaded by or owned by another user of the shared content hosting and delivery platform 107. In some implementations, the users utilizes a recording device (not shown), such as a built-in or external microphone, of the client device 105 to record their commentary, and then uploads the recorded commentary to the shared content hosting and delivery platform 107. When the audio commentary is uploaded to the shared content hosting and delivery platform 107, it may be accompanied by an identifier (ID) of the content to which the audio commentary is related to.

When the audio commentary and associated ID of the content to which the audio is related to are received by the front-end server 110, the front-end server 110 may pass the received audio commentary to the audio engine 120 for processing. In one implementation, the audio engine 120 includes a synchronization module 122 and a UI module 124. The synchronization module 122 may access the video portion of the user content identified by the ID provided with the received audio commentary from content data store 130. The synchronization module 122 may then synchronize the separate audio commentary and video components together to provide a single content feed for a user of the shared content hosting and delivery platform.

In one implementation, the synchronization is accomplished by using markers in the audio and video data to associate unique points in time between the audio and video data. The markers may be timestamps encoded in the data. The synchronization module 122 may utilize these markers to merge audio and video data in a synchronized manner.

In some implementations, the commentary associated with a content item may be decoupled from an environmental sound stream of the content item. The environmental sound stream may include the background noise of the content item occurring while the content item is recorded. For example, in the case of a sporting event as a content item, the commentary audio portion of the content item may be decoupled from the other audio feeds of the content item including background noise (e.g., an audience at the sports event or the noise generated by the participants in the sports event). The decoupling may be performed using signal processing that separates audio signals having predetermined markers. As a result, the audio commentary may be synchronized with the video portion, as well as the environmental audio portion of the content item.

In some implementations, a viewer may choose to remove the audio commentary entirely from the content item, so that the viewer may listen to the environmental sound stream of the content item alone while viewing the video portion of the content item. In further implementations, the environmental sound stream may be divided into selections for the viewer's preference, so that a viewer may choose an option to listen to a portion of the background noise that is biased to or matches the viewer's interest. For example, the viewer may elect to listen to a section of a stadium having fans of the same type or bias as the viewer.

In one implementation, the content item for which a separate audio commentary is provided is a live event streamed by the shared content hosting and delivery platform 107. In one implementation, "live" refers to the simultaneous occurrence and broadcast of an event. If the content item is a live event, the synchronization module 1221 may introduce a delay in the video portion of the content item in order to accommodate the audio commentary that is recorded at another location for the associated video portion. For example, assume that users A and B are in locations LocA and LocB, respectively. User A chooses to become an announcer for a live stream of a content item and user B chooses to listen to user A's comments for that same stream. Assume that the latency is a constant 100 ms between any two locations (to make calculations simpler; in practice this may depend on various factors such as distance, network properties, etc).

At time T0 user A starts recording his or her audio stream. Assume that the live stream is at position V0 and the audio recording is at position A0. User B should hear A0 and V0 synchronized, but obviously cannot do so at time T0 as the audio and video portions are in different locations. The recorded audio should be returned from LocA to the backend audio engine (at LocC) and then be sent to LocB from LocC.

As a result, the minimum delay for the video stream is the round trip time from LocA to LocC and from LocC to LocB. At a minimum the following delay should be implemented for user B who is watching the live event:

$$\text{artificial delay} = D0 + D1 + D2 = 400 \text{ ms},$$

where:
$D0$=100 ms network latency from LocA to LocC,
$D1$=Time to process and possibly store the audio stream, say, 200 ms, and
$D2$=100 ms network latency from LocC to LocB, Artificial delay may include a delay that is not directly resulting from the transmission of the signal, but is added to the signal from a source outside of the transmission of the signal. Note that there may be additional smaller processing delays before the audio commentary portion arrives onto the network in LocA and after the audio data leaves the network at LocB, but those are likely to be insignificant amounts.

As a result, in the above example, user B watching the live stream with user A's commentary would watch it with approximately half a second delay compared to the original live stream. To cope with this delay, implementations of the disclosure may merge the audio and video stream at either of the client device 105 or at a backend (e.g., at the synchronization module 122) of the shared content hosting and delivery platform 107.

In one implementation, the audio and video streams are merged at the client device 105. Merging at the client device 105 may occur when the audio and video portions originate from different servers, and potentially different datacenters, or when the client device 105 directly provides the audio and the video is provided from a different server or datacenter.

In other implementations, the audio engine 120, and in particular the synchronization module 122, may introduce the artificial delay to the video portion of the live event when synchronizing audio and video streams for the content item. In this case, the client device 105 receives a regular media stream that includes the audio and video portions that are already synchronized.

In one implementation, the UI module 124 provides an interface to a user of the shared content hosting and delivery platform 107 to select from a plurality of audio commentary feeds that are associated with a single content item. The plurality of audio commentary feeds may be provided by multiple different users of the shared content hosting and delivery platform 107, and the different users are not necessarily the owners of the content to which the audio comments are directed. In this way, a user of the shared content hosting and delivery platform 107 may select a preferred commentator to listen to while viewing a particular content item. For example, this may provide a plethora of commentary options based on language, voice, bias, knowledge, and other factors for a user to choose from when viewing a content item streamed from the shared content hosting and delivery platform 107. Furthermore, it enables any user of the shared content hosting and delivery platform 107 that has a recording device to provide audio commentary, with the potential of reaching a wide audience.

In some implementations, a user providing an audio commentary can blend advertisements including either or both of audio and video into the audio commentary stream from the user. The advertisements may be provided as an option for the announcer to play on an interface of the user's perspective. In one implementation, the UI module 124 provides such an interface to the user.

The UI module 124 may also display additional information regarding each audio commentary associated with a content item. This additional information may be provided to the announcer as feedback on an interface of the user's perspective. The additional information may include various statistics about announcers and events, user ratings, and classification of announcers. For example, the additional information may detail a number of users listening to the announcer's audio stream, an amount of time users have spent listening to an announcer's audio stream, and various statistics about advertisements run during an announcer's audio stream (e.g., how many users are tuned in when the advertisement is played, how many users tune away from the announcer when the advertisement is played, number of times the ad has been played, etc.).

In some implementations, the audio commentary received for a user content item may be stored separately from the content item, for example, in audio data store 140. Audio engine 120 may access their audio commentary at a later time when requested by a viewing user to be played along with the content item.

Although FIG. 1 provides a description of a client-server communication architecture, implementations of the disclosure may also be used in other communication architectures, such as a peer-to-peer architecture. In a peer-to-peer architecture implementation, the synchronization module 122 may be located at a client and executed in an application of the viewer, such as a browser, smart phone application, tablet application, television application, or similar such applications.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
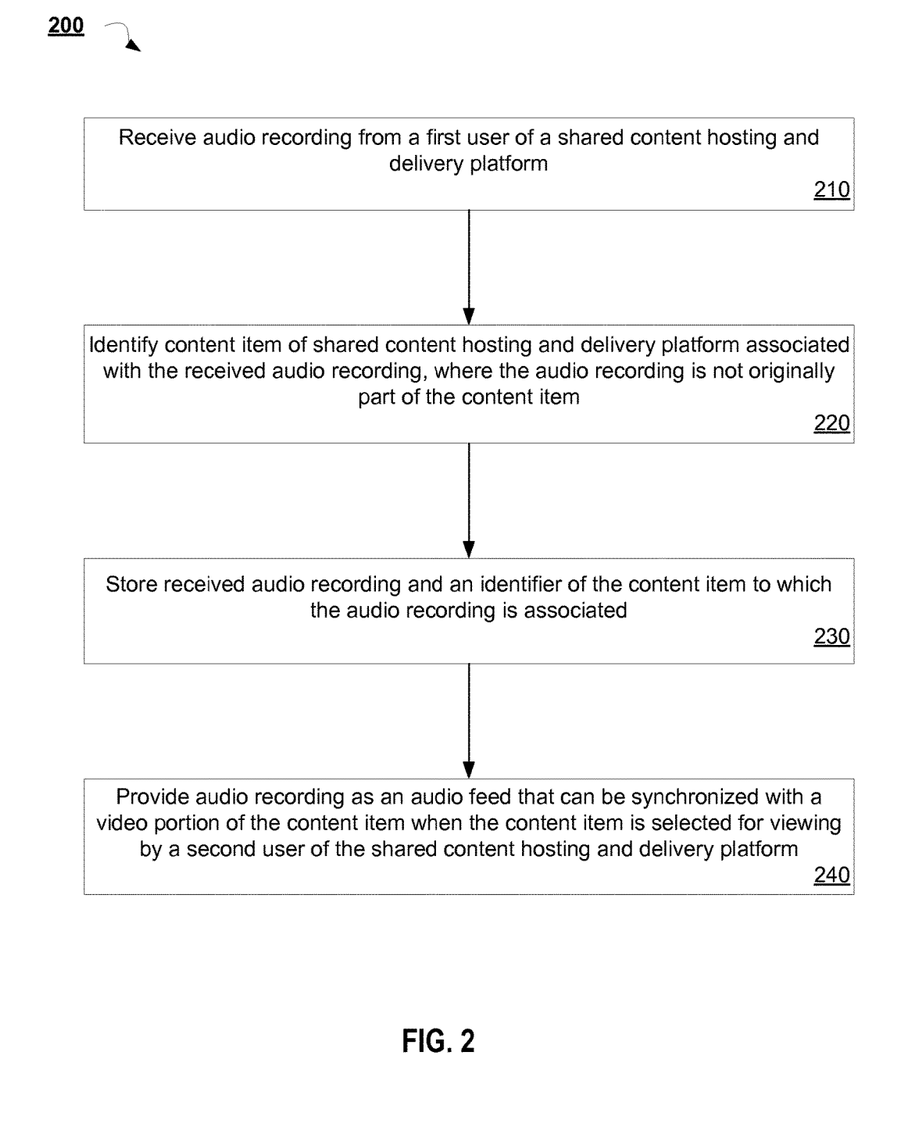
FIG. 2 is a flow diagram illustrating a method for receiving disparate audio broadcasts to a content item of a content sharing platform, according to some implementations.

FIG. 2 is a flow diagram illustrating a method 200 for receiving disparate audio broadcasts for a content item of a content sharing platform, according to some implementations of the disclosure. The method 200 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by audio engine 120 of a shared content hosting and delivery platform 107, as shown in FIG. 1.

Referring to FIG. 2, at block 210, method 200 receives an audio recording from a first user of a content provider (e.g., shared content hosting and delivery platform 107). In one implementation, the audio recording is made by the first user via a recording device at the first user's device. The audio recording may be associated with (e.g., commentary regarding) a content item provided by the shared content hosting and delivery platform 107. In some implementations, the content item is not originated by or owned by the first user.

At block 220, an audio engine 120 of the shared content hosting and delivery platform 107 identifies the content item associated with the received audio recording. In one implementation, the audio recording is received with an ID of the content item, and the audio engine uses this ID to identify the content item in the shared content hosting and delivery platform 107. At block 230, the received audio recording is stored and an ID of the content item associated with the audio recording is also stored with the audio recording.

Subsequently, at block 240, the audio recording is provided as an audio feed that can be synchronized with a video portion of the content item. The synchronization of the audio recording and the video portion may occur when the content item is selected for viewing by a second user of the shared content hosting and delivery platform and when the second user also selects the audio recording to be streamed for the content item.

Figure 3:
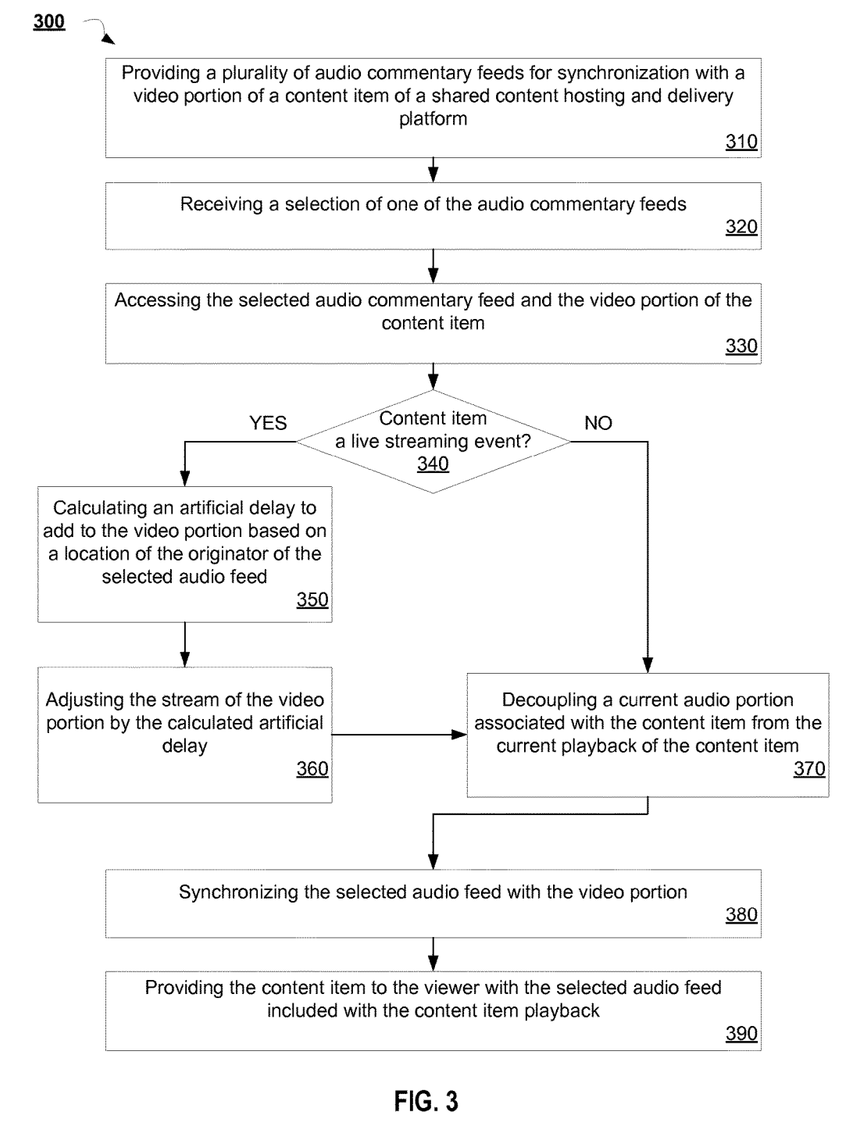
FIG. 3 is a flow diagram illustrating a method for providing disparate audio broadcasts to a content item of a content sharing platform, according to some implementations.

FIG. 3 is a flow diagram illustrating a method for providing disparate audio broadcasts for a content item of a content sharing platform, according to an implementation of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one implementation, method 300 may be performed by synchronization module 122 of a shared content hosting and delivery platform 107, as shown in FIG. 1.

Referring to FIG. 3, at block 310, method 300 provides a plurality of audio commentary feeds for synchronization with a video portion of a content item of a shared content hosting and delivery platform 107. In one implementation, the plurality of audio commentary feeds do not originate with the content item and are recorded separately from an original audio portion of the content item. At block 320, a selection of one of the audio commentary feeds is received from a viewer of the shared content hosting and delivery platform 107. In one implementation, the viewer selecting the audio commentary feed is currently viewing or requesting to view the content item. Then, at block, 330, the selected audio commentary feed and the video portion of the content item are accessed.

At decision block 340, it is determine whether the content item is a live streaming event. If so, then method 300 proceeds to block 350 to calculate an artificial delay to add to the video portion of the content item. In one implementation, the calculated artificial delay is based on a location of the user providing the selected audio feed and a location of the user requesting the selected audio feed. At block 360, the stream of the video portion is adjusted by the calculated artificial delay. Method 300 then continues to block 370. When the content item is not a live streaming event at decision block 340, method 300 also proceeds directly to block 370.

At block 370, a current audio portion associated with the content item is decoupled from the content item. In one implementation, signal processing techniques are utilized to accomplish the decoupling. Then, at block 380, the selected audio feed is synchronized with the video portion of the content item. Note that if the content item was a live streaming event, this would include synchronizing the adjusted video portion with the selected audio feed portion of the content item. Lastly, at block 390, the content item is provided to the viewer with the selected audio commentary stream included with the content item playback.

Figure 4A:
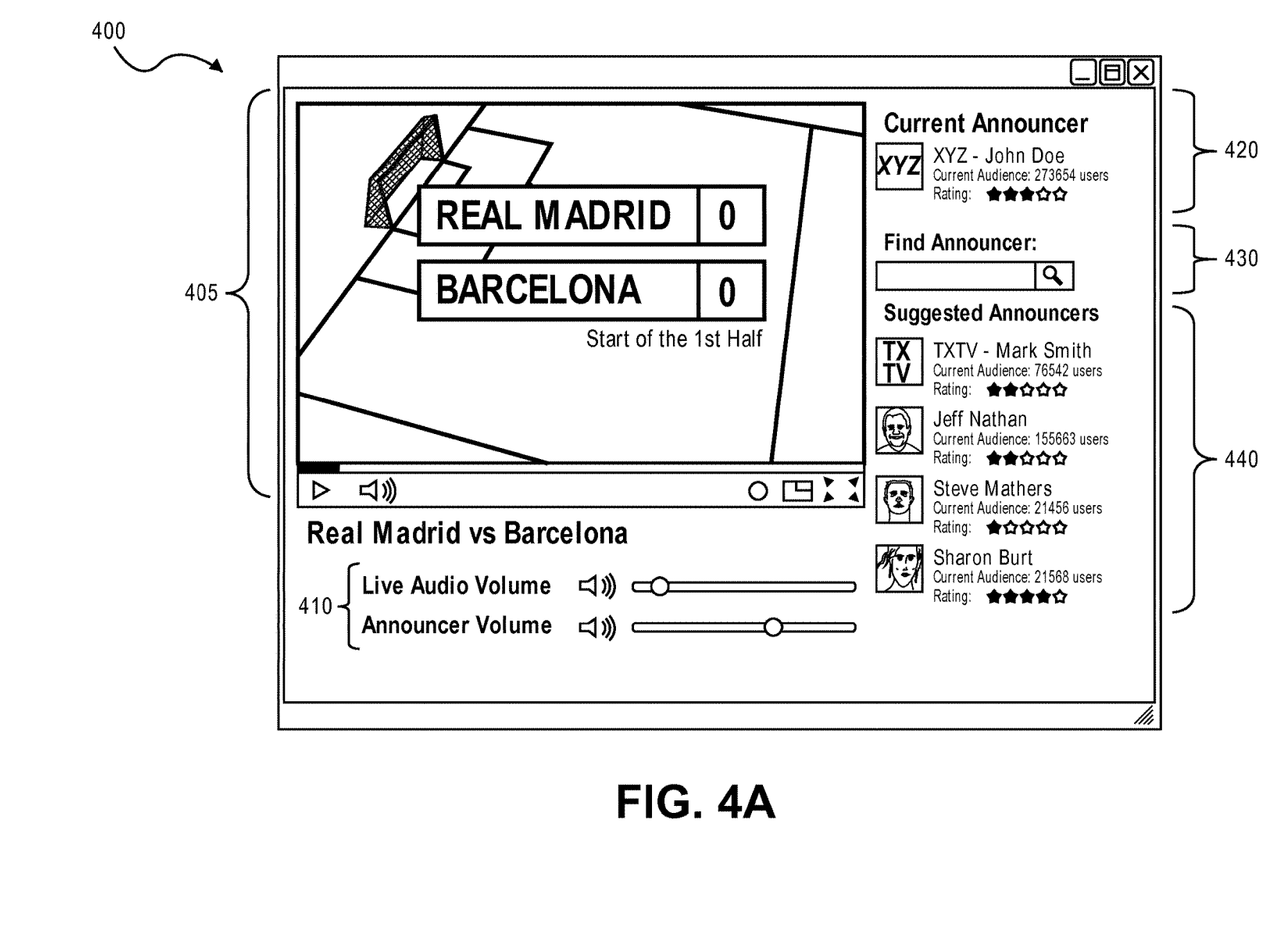
FIGS. 4A and 4B are block diagrams illustrating example user interfaces (UIs) for providing disparate audio broadcasts to a content item of a content sharing platform.
Figure 4B:
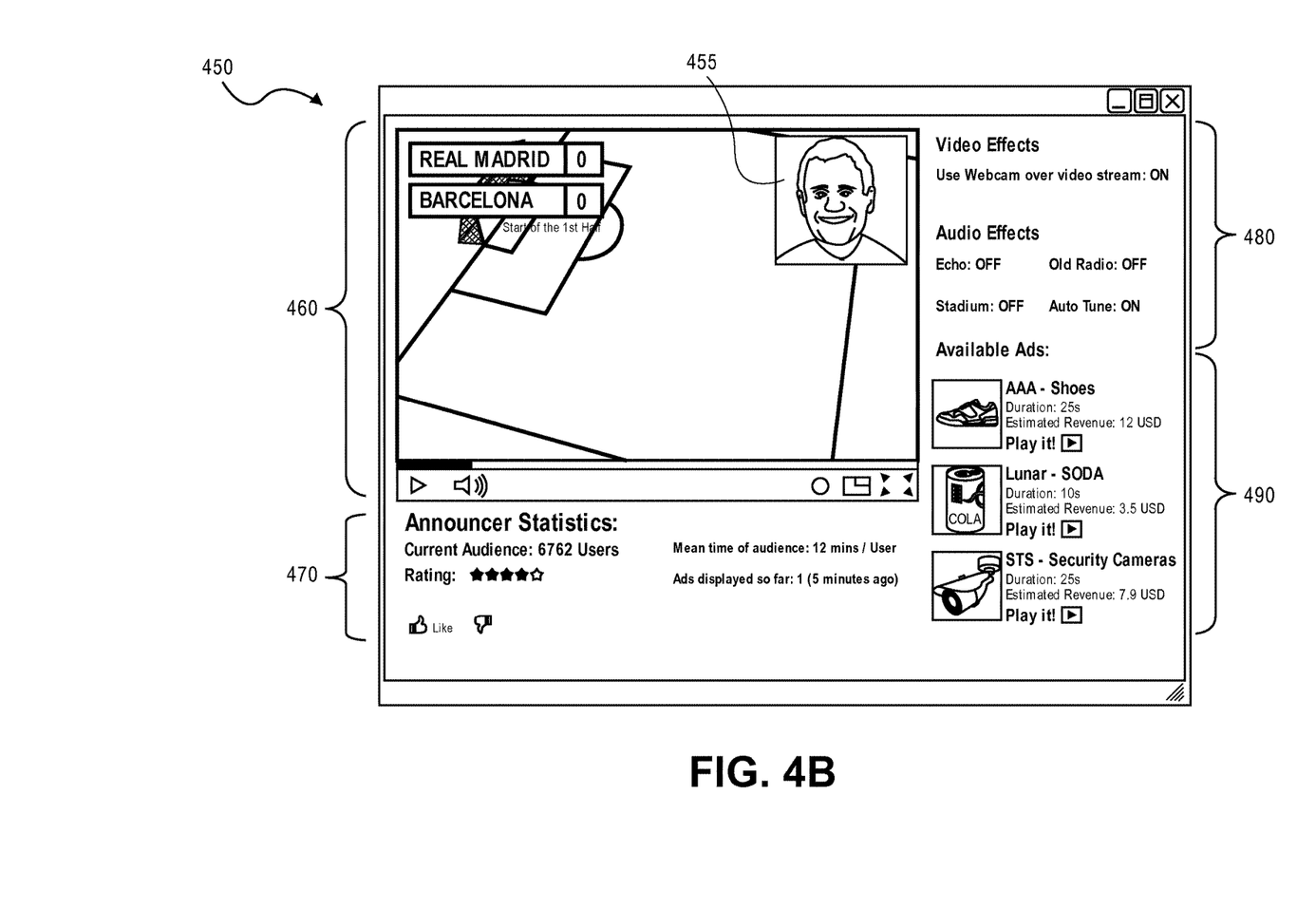

FIGS. 4A and 4B illustrate example screenshots of a UI providing disparate audio broadcasts for a content item of a content sharing platform according to implementations of the disclosure. The example screenshots of FIGS. 4A and 4B are for illustrative purposes only and are not meant to limit implementations of the disclosure.

FIG. 4A illustrates an example screenshot of a UI 400 provided to a user viewing a content item. Playback of the content item is shown in video window 405. Information detailing an announcer currently streaming audio associated with the video is shown in portion 420 of UI 400. In addition, a list 440 of other announcers that the viewing user may select to listen to in association with the video playing in window 405 is provided in portion 440 of UI 400. The viewing user may also utilize a search function 430 of UI to search for a particular announcer that the viewing user prefers. Furthermore, the viewing user may adjust volume levels for the announcer and any secondary environmental audio using volume controls 410.

FIG. 4B illustrates an example screenshot of a UI 450 provided to an announcer providing (e.g., recording) audio commentary for a content item. Playback of the content item to which the announcer is providing commentary for is shown in window 460 of UI 450. In one implementation, a picture-in-picture window 455 within window 460 may show video (e.g., a webcam feed) of the announcer while making the audio commentary recording. UI 450 may also display a variety of announcer statistics 470, such as a size of the current listening audience, an overall rating for the announcer, a mean listening time associated with the announcer, advertisement statistics associated with the announcer's commentary, and a like/dislike statistic. The statistics shown in section 470 are solely provided as examples and other announcer statistics may also be shown in section 470.

Furthermore, UI 450 may include configuration settings 480 that are adjustable by the announcer. For example, the configuration settings may allow the announcer to view the picture-in-picture window 455 overlaying the video stream and adjust various audio settings (such as echo, old radio, stadium, auto-tune, etc.). The UI 450 may also include a listing of advertisements 490 that may be selected by the announcer for playback during the audio commentary feed of the announcer.

Figure 5:
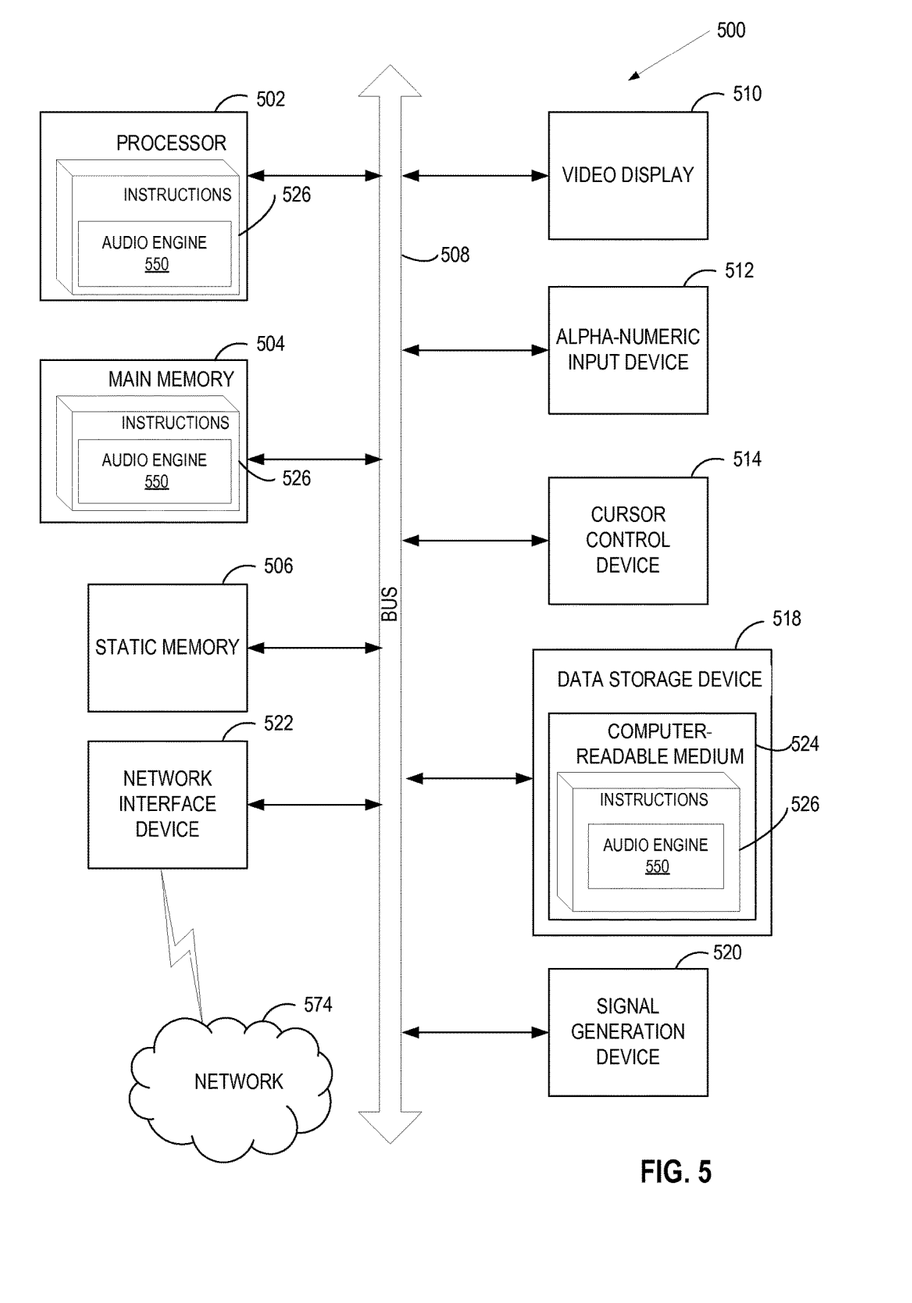
FIG. 5 is a block diagram illustrating an exemplary computer system, according to some implementations.

FIG. 5 illustrates a diagrammatic representation of a machine in the exemplary form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

In one implementation, the instructions 526 include instructions for an audio engine 550, which may correspond to audio engine 120 of FIG. 1, and/or a software library containing methods that call an audio engine. While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" or to "one implementation" or "an implementation" means that a particular feature, structure, or characteristic described in connection with the embodiment is included in at least one embodiment. Thus, the appearances of the phrase "in one embodiment", "in an embodiment", "in one implementation", "in an implementation" in various places throughout this specification are not necessarily all referring to the same embodiment or implementation. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

providing, by a processing device, selectable links to a plurality of audio commentaries corresponding to a content item comprising a video portion, the content item provided by a content sharing platform, wherein the plurality of audio commentaries are recorded by different users of the content sharing platform separately from an original audio recording of the content item;

identifying other audio commentaries for inclusion in the plurality of audio commentaries, the other audio commentaries identified based on at least one search term inputted via a user interface (UI) comprising at least the video portion of the content item, the UI rendered at a computing device of a viewer of the content item;

receiving, by the processing device, an indication of a selection of an audio commentary from the plurality of audio commentaries, the selection received from the computing device of the viewer;

synchronizing, by the processing device, the selected audio commentary with the video portion of the content item;

decoupling environmental noise from the original audio recording; and providing, by the processing device, the synchronized audio commentary and the decoupled environmental noise, in lieu of the original audio recording, in conjunction with the video portion to the computing device of the viewer via the UI, wherein the volume of the synchronized audio commentary and the decoupled environmental noise are separately adjustable and are presented as separately-adjustable controls simultaneously provided in a page of the UI, the page further comprising the video portion.

2. The method of claim 1, further comprising providing a user interface (UI) to display a listing of the plurality of audio commentaries.

3. The method of claim 1, further comprising:
receiving, from the viewer, a selection of another audio commentary of the plurality of audio commentaries;
decoupling the selected audio commentary from the video portion of the content item;
synchronizing the another audio commentary with the video portion of the content item; and
providing the synchronized another audio commentary and the video portion to the viewer.

4. The method of claim 1, wherein the providing the audio commentary further comprises adjusting the video portion with an artificial delay that is based on a location of a user that recorded the audio commentary and a location of the viewer.

5. The method of claim 1, wherein a recording device of a computing device of a user of the content sharing platform records the audio commentary.

6. The method of claim 1, further comprising categorizing the audio commentary into a category comprising at least one of a language, a voice, a bias, a knowledge, or a locale.

7. A non-transitory machine-readable storage medium storing instructions which, when executed, cause a data processing system to perform operations comprising:
streaming, by a processing device, a live event from a content sharing platform comprising the processing device;
receiving, while the live event is streaming, a plurality of audio streams corresponding to the live event, the plurality of audio streams provided by users of the content sharing platform separate from an original audio stream of the live event, wherein the plurality of audio commentaries are recorded by different users of the content sharing platform separately from the original audio stream of the live event;
identifying other audio streams for inclusion in the plurality of audio streams, the other audio streams identified based on at least one search term inputted via at least one user interface (UI) comprising at least a video portion of the live event, the UI rendered at a computing device of a viewer of the content item;
decoupling environmental noise from the original audio recording; and
providing at least one of the plurality of audio streams and the decoupled environmental noise, in lieu of the original audio stream, in conjunction with the streaming of the live event to other users of the content sharing platform via the at least one UI, wherein the volume of the at least one of the plurality of audio streams and the decoupled environmental noise are separately adjustable and are presented as separately-adjustable controls simultaneously provided in a page of the at least one UI, the page further comprising the streaming of the live event in the video portion.

8. The non-transitory machine-readable storage medium of claim 7, wherein the plurality of audio streams are selectable for playback in conjunction with a video portion of the live event.

9. The non-transitory machine-readable storage medium of claim 7, wherein the providing the at least one of the plurality of audio streams further comprises providing another UI of the content sharing platform to display a listing of the plurality of audio streams on a page of the content sharing platform that details the live event.

10. The non-transitory machine-readable storage medium of claim 7, wherein the operations further comprise categorizing the received plurality of audio streams into categories comprising at least one of a language, a voice, a bias, a knowledge, or a locale.

11. The non-transitory machine-readable storage medium of claim 7, wherein the at least one of the plurality of audio streams is synchronized with a video portion of the live event at a device of a user requesting to view the live event and to listen to the at least one of the plurality of audio streams.

12. The non-transitory machine-readable storage medium of claim 7, wherein the at least one of the plurality of audio streams is synchronized with a video portion of the live event at the content sharing platform.

13. A system comprising:
a processing device;
a memory coupled to the processing device, the memory to store a plurality of content items each having a video portion, the plurality of content items provided by a content sharing platform; and
an audio engine executable by the processing device from the memory, the audio engine to:
provide selectable links to a plurality of audio commentaries that can be selected to play in conjunction with a video portion of a content item of the plurality of content items, the plurality of audio commentaries recorded by users of the content sharing platform separately from an original audio recording of the content item;
identify other audio commentaries for inclusion in the plurality of audio commentaries, the other audio commentaries identified based on at least one search term inputted via a user interface (UI) comprising at least the video portion of the content item, the UI rendered at a computing device of a viewer of the content item;
receive an indication of a selection of an audio commentary from the plurality of audio commentaries, the indication received from the computing device of the viewer of the content item;
synchronize the selected audio commentary with the video portion of the content item;
decouple environmental noise from the original audio recording; and
provide the synchronized audio commentary and the decoupled environmental noise, in lieu of the original audio recording, in conjunction with the video portion to the computing device of the viewer via the UI, wherein the volume of the synchronized audio commentary and the decoupled environmental noise are separately adjustable and are presented as separately-adjustable controls simultaneously provided in a page of the UI, the page further comprising the video portion.

14. The system of claim 13, wherein the audio engine further to provide the audio commentary in conjunction with the video portion to the viewer.

15. The system of claim 13, wherein the audio engine further to provide a user interface (UI) to display a listing of the plurality of audio commentaries.

16. The system of claim 13, wherein the audio engine to synchronize the selected audio commentary with the video portion further comprises the audio engine to adjust the video portion with an artificial delay that is based on a location of a user that recorded the audio commentary and a location of the viewer.

17. The system of claim 13, wherein the audio engine is further to categorize each of the plurality of the audio commentaries into a category comprising at least one of a language, a voice, a bias, a knowledge, or a locale.

18. The system of claim 13, wherein the audio engine is further to:
- receive, from the viewer, a selection of another audio commentary of the plurality of audio commentaries;
- decouple the selected audio commentary from the video portion of the content item;
- synchronize the another audio commentary with the video portion of the content item; and
- provide the synchronized another audio commentary and the video portion to the viewer.

* * * * *